United States Patent [19]

Sasaki et al.

[11] 4,293,671
[45] Oct. 6, 1981

[54] ORGANOPOLYSILOXANE COMPOSITION FOR PREPARING PEELABLE FILM

[75] Inventors: Shosaku Sasaki; Nobuo Kaiya, both of Ichihara, Japan

[73] Assignee: Toray Silicone Company, Ltd., Ichihara, Japan

[21] Appl. No.: 112,871

[22] Filed: Jan. 17, 1980

[30] Foreign Application Priority Data

Feb. 16, 1979 [JP] Japan ................... 54-15988

[51] Int. Cl.$^3$ ............... C08L 83/06; C08G 77/12
[52] U.S. Cl. .................. 525/478; 528/31; 528/32
[58] Field of Search ............ 525/478; 528/31

[56] References Cited

U.S. PATENT DOCUMENTS

| | | | |
|---|---|---|---|
| 3,436,366 | 4/1969 | Modic | 525/478 |
| 3,527,655 | 9/1970 | Ballard | 525/478 |
| 3,699,073 | 10/1972 | Wada et al. | 525/478 |

*Primary Examiner*—Wilbert J. Briggs, Sr.
*Attorney, Agent, or Firm*—George A. Grindahl

[57] ABSTRACT

Solventless organopolysiloxane compositions are disclosed which, when coated on a substrate and cured, will release adhesives with moderate force. These compositions are useful for coating flexible substrates such as paper, laminated paper, synthetic film and metal foil which are used as wrapping paper for asphalt, tapes, labels, etc. These compositions consist essentially of a mixture of a low-viscosity, vinyl-containing organopolysiloxane, an organohydrogenpolysiloxane, a vinyl-containing organosiloxane copolymer resin and a hydrosilylation catalyst.

2 Claims, No Drawings

ORGANOPOLYSILOXANE COMPOSITION FOR PREPARING PEELABLE FILM

BACKGROUND OF THE INVENTION

This invention relates to an organopolysiloxane composition for preparing peelable film. More specifically, this invention relates to a solventless type organopolysiloxane composition for preparing peelable film which exhibits moderate peelability from various adhesive materials whose properties do not depend on time and whose long-lasting adhesive capacity is high.

It is an established fact that a cured film of organopolysiloxane on the surface of a flexible material such as paper, laminated paper, synthetic film, knitted goods or metal foil can increase the peelability of the flexible material from an adhesive. Examples of the organopolysiloxane composition used for the above-mentioned purpose are polycondensation type organopolysiloxane compositions composed of a diorganopolysiloxane having terminal hydroxyl groups, an organohydrogenpolysiloxane and organotin compounds as curing catalysts (Japanese Pat. No. Sho 35 {1960}-13709); and addition-reaction type organopolysiloxane compositions composed of a vinyl-containing organopolysiloxane, an organohydrogenpolysiloxane and platinum compounds as curing catalysts (Japanese Pat. No. Sho 46 {1971}-26798). Japanese Pat. No. Sho 49 {1974}-27033 and Japanese Kokai Pat. No. Sho 52 {1977}-86985 describe an organopolysiloxane composition for preparing peelable film which exhibits a moderate peelability. However, these organopolysiloxane compositions are principally composed of organopolysiloxanes with a high degree of polymerization so that they must be diluted with a large quantity of organic solvent in order to be coated on the base material effectively. The organic solvents include aliphatic solvents such as hexane and heptane, aromatic solvents such as benzene, toluene and xylene, halogenated hydrocarbon solvents such as trichloroethylene, perchloroethylene and carbon tetrachloride, and ethyl acetate. However, these solvents are toxic to workers, cause environmental pollution, fires and explosions, and require recovery equipment. These are the traditional problems to be solved.

In order to eliminate the defects of the traditional method, Japanese Kokai Pat. No. Sho 47 {1972}-32072 and Japanese Pat. No. Sho 53 {1978}-39791 describe an organopolysiloxane for preparing peelable film which can be cured by an addition reaction, which does not use an organic solvent, that is, it can be coated without diluting it with solvent. These solventless type organopolysiloxane compositions form easily peelable films so that they cannot be used for processing paper and wrapping paper for asphalt which require a moderate peeling capacity and for such materials as tapes and labels which also require a moderate peeling capacity.

SUMMARY OF THE INVENTION

It is an object of this invention to provide solventless organopolysiloxane compositions which cure by an addition-type reaction to provide peelable films having moderate peeling capacity.

This object, and others, are achieved by the compositions of this invention which comprise a mixture of a low-viscosity, vinyl-containing organopolysiloxane, an organohydrogenpolysiloxane, a vinyl-containing organosiloxane copolymer resin and a hydrosilylation catalyst.

DETAILED DESCRIPTION OF THE INVENTION

This invention relates to an organopolysiloxane composition, curable to a peelable film, said composition being obtained by mixing components consisting essentially of (a) 100 parts by weight of an organopolysiloxane having the formula $R'_aSiO_{(4-a)/2}$ and a viscosity at 25° C. of from 40 to 3000 centipoise, wherein each R' denotes a monovalent hydrocarbon or fluorinated hydrocarbon group and a is a number from 1.9 to 2.05, at least two R' groups being vinyl and at least 70 percent of all R' groups being methyl, (b) 0.5 to 20 parts by weight of an organohydrogenpolysiloxane having at least 3 silicon-bonded hydrogen atoms per molecule and a viscosity at 25° C. of from 1 to 1000 centipoise, (c) 2 to 200 parts by weight of a copolymer composed of $R_2SiO_{2/2}$ siloxane units and/or $RSiO_{3/2}$ siloxane units in addition to $R_3SiO_{1/2}$ siloxane units and $SiO_{4/2}$ siloxane units wherein each R denotes a monovalent hydrocarbon group, at least two R groups per molecule being vinyl the molar ratio of $(R_3SiO_{1/2})/(R_2SiO_{2/2}$ plus $RSiO_{3/2})/(SiO_{4/2})$ being (0.1 to 1.5)/(0.1 to 1.0)/(1.0), and (d) a catalytic amount of a hydrosilylation catalyst, the viscosity of said organopolysiloxane composition, curable to a peelable film, having a value of from 50 to 6000 centipoise at 25° C.

Component (a) is an organopolysiloxane having the average formula $R'_aSiO_{(4-a)/2}$ wherein each R' denotes a monovalent hydrocarbon or fluorinated hydrocarbon group and a has an average value of from 1.9 to 2.05, both inclusive. Component (a) has an average of at least two vinyl groups per molecule. As shown by the number a, the molecular structure of this component has a straight-chain or branched-chain structure. A straight-chain compound is preferred. The ends of the molecular chain may be monovalent hydrocarbon groups such as methyl, vinyl and phenyl groups or hydroxyl groups. Vinyl groups are preferred from the standpoint of the rate of curing the film. This component desirably possesses at least one vinyl group in the side chains from the standpoint of the stability of the peeling capacity of the cured film.

That is, a desirable compound as component (a) is a straight-chain diorganopolysiloxane both of whose ends are blocked with vinyl groups and which possesses at least one vinyl group bonded to a silicon atom in the siloxane chain.

Examples of the above-mentioned R' groups are methyl, ethyl, propyl, octyl, vinyl, phenyl and trifluoropropyl groups. At least 70 mol% of all the R' groups must be methyl groups.

The viscosity of component (a) should be 40–3,000 cP at 25° C. When the viscosity is less than 40 cP, this compound tends to infiltrate into the base material. On the other hand, when the viscosity exceeds 3,000 cP, the compound does not exhibit an adhesive property.

Specific examples of component (a) are dimethylpolysiloxane both of whose ends are blocked with vinyl groups, dimethylsiloxane-methylvinylsiloxane copolymer both of whose ends are blocked with vinyl groups, dimethylsiloxane-methylvinylsiloxane-methylphenylsiloxane copolymer both of whose ends are blocked with vinyl groups, dimethylsiloxane-methylvinylsiloxane-diphenylsiloxane copolymer both of whose ends are blocked with vinyl groups, dimethylsiloxane-methylvinylsiloxane-methyl(3,3,3-trifluoropropyl)siloxane copolymer both of whose ends are blocked with vinyl groups, dimethylsiloxane-methylvinylsiloxane copolymer both of whose ends are blocked with methyl and/or hydroxy groups, and branched methylpolysiloxane all of whose ends are blocked with vinyl groups.

Component (b) is an organohydrogenpolysiloxane cross-linking agent for component (a). Hydrogen atoms bonded to silicon atoms in component (b) are subject to an addition reaction with vinyl groups bonded to silicon atoms of components (a) and (c) in the presence of a platinum group catalyst. For this reason, at least 3 SiH groups are needed per molecule of component (b). The viscosity of component (b) should be 1–1000 cP at 25° C. When the viscosity is too low, component (b) tends to evaporate. On the other hand, when the viscosity of component (b) is too high, the viscosity of the resulting composition becomes high resulting in poor workability of the coating. The quantity of component (b) should be 0.5–20 parts by weight relative to 100 parts by weight of component (a). When this value is less than 0.5 parts by weight, the composition is not sufficiently cured. On the other hand, when this value exceeds 20 parts by weight, the peelability of the cured film is adversely affected.

Specific examples of component (b) are organohydrogenpolysiloxane both of whose ends are blocked with triorganosilyl groups, diorganosiloxane-organohydrogenpolysiloxane copolymer both of whose ends are blocked with triorganosilyl groups, said types of polysiloxanes both of whose ends are blocked with diorganosilyl groups instead of triorganosilyl groups, and cyclic organohydrogensiloxanes. Examples of organic groups in component (b) are methyl, ethyl, octyl and phenyl groups. More than one type of organic group may be contained in one molecule.

Component (c) is a characteristic component of this invention which causes the cured film to be moderately peelable. This compound contains vinyl groups in the molecule in order to be subject to the addition reaction for cross-linking with component (b) with the result that the peelability does not depend on time and the long-lasting adhesive capacity is high.

Japanese Pat. No. Sho 49 {1974}-27033 describes an organopolysiloxane composition for preparing peelable film which contains a benzene-soluble copolymer composed of $R''_3SiO_{1/2}$ units and $SiO_{4/2}$ units wherein $R''$ represents methyl groups, ethyl groups, etc. and which can be cured by an addition reaction. On the other hand, component (c) used by the method of this invention contains $R_2SiO_{2/2}$ and/or $RSiO_{3/2}$ units in addition to $R_3SiO_{2/2}$ units and $SiO_{4/2}$ units and contains at least 2 vinyl groups per molecule. This is an essential feature of component (c). For this reason, the cured film of the composition produced by the method of this invention exhibits peelability which does not depend on time. On the other hand, although the cured film of the composition produced by the method described in Japanese Pat. No. Sho 49 {1974}-27033 exhibits moderate peelability, the peelability is time-dependent. This is a clear distinction between the two above-mentioned methods.

The $R_3SiO_{1/2}$, $R_2SiO_{2/2}$ and $RSiO_{3/2}$ units of this component exhibit miscibility with component (a); the $R_2SiO_{2/2}$ and $RSiO_{3/2}$ units suppress the time-dependent peelability and the $SiO_{4/2}$ units decreases the peelability. Therefore, the ($R_3SiO_{1/2}$ unit)/($R_2SiO_{2/2}$ unit plus $RSiO_{3/2}$ unit)/($SiO_{4/2}$ unit) molar proportions must be appropriately selected. These molar proportions should be (0.1–1.5)/(0.1–1.0)/(1.0). A preferred copolymer contains said siloxane units in molar proportions of (0.5–1.5)/(0.1–1.0)/(1.0). $R_2SiO_{2/2}$ and $RSiO_{3/2}$ may be present simultaneously.

Component (c) may be a copolymer of $R_3SiO_{1/2}$, $R_2SiO_{2/2}$ and $SiO_{4/2}$ units, a copolymer of $R_3SiO_{1/2}$, $RSiO_{3/2}$ and $SiO_{4/2}$ units, or a copolymer of $R_3SiO_{1/2}$, $R_2SiO_{2/2}$, $RSiO_{3/2}$ and $SiO_{4/2}$ units. When two of the R groups are vinyl groups, the rest of the R groups may be vinyl groups and/or other monovalent hydrocarbon groups, such as methyl and phenyl groups. Examples of $R_3SiO_{1/2}$ units are $(CH_3)_3SiO_{1/2}$, $(CH_3)_2(CH_2=CH)SiO_{1/2}$, $(CH_3)_2C_6H_5SiO_{1/2}$ and $CH_3(C_6H_5)(CH_2=CH)SiO_{1/2}$ units. Examples of $R_2SiO_{2/2}$ units are $(CH_3)_2SiO_{2/2}$, $CH_3(CH_2=CH)SiO_{2/2}$, $CH_3(C_6H_5)SiO_{2/2}$ and $CH_3(C_8H_{17})SiO_{2/2}$ units. Examples of $RSiO_{3/2}$ units are $CH_3SiO_{3/2}$, $CH_2=CHSiO_{3/2}$ and $C_6H_5SiO_{3/2}$ units.

This component can be produced by the cohydrolysis of $R_3SiX$ with $R_2SiX_2$ or the cohydrolysis of $RSiX_3$ with $SiX_4$, where X represents halogen atoms, such as chlorine or bromine, or alkoxyl groups, or it can be easily produced by the reaction of $R_3SiX$ and $R_2SiX_2$ or $RSiX_3$ with an acidic colloidal dispersion of silica, where X has the same meaning as above. (Japanese Pat. No. Sho 28 {1953}-5699). For this reason, this component usually contains several percent silanol or alkoxyl groups. Needless to say, as described in Japanese Pat. No. Sho 49 {1974}-27033, this component can be reacted with a triorganosilylating agent in order to decrease or eliminate silanol groups. In any case, this component is thought to contain silanol or alkoxyl groups. This component is usually in the form of a dense and viscous liquid, a powder or a solid.

The quanity of component (c) should be 2–200 parts by weight relative to 100 parts by weight of component (a). When this quantity is less than 2 parts by weight, the cured film exhibits high peelability. On the other hand, when this quantity exceeds 200 parts by weight, the cured film exhibits low peelability and the composition is too viscous, resulting in poor workability of the coating.

Component (d) is a hydrosilylation catalyst used for the addition reaction of components (a) and (c) with component (b) in order to carry out cross-linking. Examples of this well-known catalyst are chloroplatinic acid, alcohol-modified chloroplatinic acid, platinum-olefin complexes, platinum-ketone complexes, platinum-vinylsiloxane complexes, solid platinum on an alumina or silica support, platinum black, and rhodium and palladium catalysts which are described in Japanese Pat. No. Sho 53{1978}-29678. The quantity of this catalyst used is extremely small and is usually 10 to 1,000 parts by weight of the platinum group metal for every one million parts by weight of the combined quantity of components (a) to (c). Needless to say, this quantity may be larger or smaller than the above-mentioned value depending on the desired catalytic activity.

The composition of this invention can be obtained by simply mixing components (a) to (d) in the above-mentioned proportions; however, component (c) is desirably dissolved in component (a) homogeneously in order to effectively achieve the purpose of this invention. Component (c) may be dissolved in an organic solvent and the resulting solution is then poured into component (a), or alternatively, component (c) may be agitated and mixed with component (a) at a high rate of shear, or alternatively component (c) may be agitated and mixed with component (a) at elevated temperature.

Needless to say, the other components should also be homogeneously mixed.

If the composition is not intended to be used immediately, a mixture of components (a), (c) and (d) are stored separately from component (b) and are mixed therewith immediately prior to use.

The composition produced by the above-mentioned method of this invention can be coated on paper, laminated paper, synthetic resin film and metal foil by the traditional method using a gravure-coater or roll-coater and are then cured at high temperature. The resulting cured film exhibits time-independent peelability and high, long-lasting adhesive capacity. The quantity of the composition coated is usually 0.3–1.5 g/m². The curing temperature is usually 100°–200° C. and the curing time is usually 40–60 seconds.

The resulting peelable material is appropriate for processing paper, wrapping paper for asphalt, tapes and labels.

The composition produced by the method of this invention can be used without further treatment; however, organophosphorus compounds, which prolong the pot life at room temperature; organonitrogen compounds, such as benzotriazole; reaction retarders, such as acetylene-containing alcohol; agents which improve adhesion to the base material; coloring matter and pigments can be added to the compositions. A small quantity of organic solvent may also be added unless it adversely affects the properties of the composition.

This invention will be explained, but not limited, by demonstrative examples. The peeling resistance, long-lasting adhesive capacity and blocking properties were measured by the following methods.

Peeling resistance

A prescribed quantity of an organopolysiloxane composition was coated on the surface of a base material and then cured. An acrylic adhesive (Olibine BPS-5127 from Toyo Ink Mfg. Co., Ltd.) or a rubber adhesive (Olibine BPS-2411) from Toyo Ink Mfg. Co., Ltd.) was coated on the resulting cured film and dried. Backing paper was applied to the adhesive and allowed to stand at room temperature under load of 20 g/cm₂.

The backing paper and the adhesive was peeled off the base material and its cured release layer at 90° using a Tensilon. The force (g) required for peeling off the paper was measured.

Residual adhesion percentage (long-lasting adhesive capacity value

A specified quantity of an organopolysiloxane composition was coated on the surface of a base material and then cured. Polyester Tape 31 B from Nitto Denko Co., Ltd. was applied on the resulting cured film. A load (20 g/cm²) was placed on the tape which was subsequently heat treated at 70° C. for 20 hours. The tape was peeled off and then applied to a plate of stainless steel #280. The force required for peeling the tape from the stainless steel was measured and was expressed as a percentage relative to the force required for peeling off a standard tape.

Blocking properties

A specified quantity of an organopolysiloxane composition was coated on the surface of a base material and then cured. The cured film surfaces were put one upon another, subjected to a load of 100 kg/cm² and then treated at 50° C. for 16 hours. The force (g) required for peeling was measured.

In the examples, Me means a methyl group and Vi means a vinyl group.

EXAMPLE 1

Dimethylsiloxane-methylvinylsiloxane copolymer (100 parts by weight; vinyl group content, 1.0 wt.%; viscosity at 25° C., 1500 cP) both of whose ends were blocked with dimethylvinylsiloxyl groups was combined with methylhydrogenpolysiloxane (5 parts by weight; viscosity at 25° C., 5 cP) both of whose ends were blocked with trimethylsiloxyl groups. The resulting mixture was combined with powdery copolymer (vinyl group content, 1.3 wt.%; 0, 10 and 50 parts by weight) composed of $ViMe_2SiO_{1/2}$. $MeSiO_{3/2}$ and $SiO_{4/2}$ units (0.39/0.36/1.0 molar ratio) in order to produce a homogeneous solution. Comparative Sample 1 and Samples 1 and 2 were thus prepared. The viscosities of these samples at 25° C. were 1,210 cP, 1,590 cP and 4,980 cP, respectively. On the other hand, Comparative Samples 2 and 3 were prepared from powdery copolymer (vinyl group content, 1.3 wt%; 10 and 50 parts by weight) composed of $ViMe_2SiO_{1/2}$ and $SiO_{4/2}$ units (0.43/1.0 molar ratio) instead of the copolymer of $ViMe_2SiO_{1/2}$, $MeSiO_{3/2}$ and $SiO_{4/2}$ units. The viscosities of these samples at 25° C. were 1540 cP and 4890 cP, respectively. Alcohol-modified platinic acid (150 ppm based on platinum) was added to, and homogeneously mixed with, each of the above-mentioned samples. The resulting composition was coated (at about 0.8 g/m²) on polyethylene laminated kraft paper and heat treated at 150° C. for 45 seconds. An adhesive (Olibine BPS-5127 from Toyo Ink Mfg. Co., Ltd.) was coated on the resulting cured film and then dried at elevated temperature.

The peeling resistance, residual adhesion percentage and blocking properties were measured. The results are given in Table I.

Samples 1 and 2 exhibited the appropriate peeling resistance, that is, moderate peelability which did not depend on time and they exhibited a high residual adhesion percentage and low blocking properties. On the other hand, Comparative Sample 1 which did not contain component (c) exhibited a very low peeling resistance; Comparative Samples 2 and 3 which did not contain either $R_2SiO_{2/2}$ or $RSiO_{3/2}$ siloxane units in the copolymer exhibited an appropriate peeling resistance; however, the peeling resistance depended significantly on time.

Concerning the workability of the coating, Comparative Samples 2 and 3 exhibited poor ability to wet polyethylene laminated paper resulting in the occurrence of a large number of pinholes. Comparative Sample 3 suffered from a large number of pinholes so that it could not be used in practical applications. On the other hand, Samples 1 and 2 exhibited excellent wetting ability and did not show the occurrence of pinholes.

TABLE I

| Sample | Peeling resistance g/5 cm | | Residual adhesion percentage % | Blocking properties g/4 cm |
| --- | --- | --- | --- | --- |
| | After 1 day | After 30 days | | |
| Sample 1 (this invention) | 32 | 34 | 94 | 2~3 |
| Sample 2 (this invention) | 79 | 77 | 96 | 2~3 |
| Comparative Sample 1 | 9 | 10 | 95 | 2~3 |

TABLE I-continued

| Sample | Peeling resistance g/5 cm After 1 day | Peeling resistance g/5 cm After 30 days | Residual adhesion percentage % | Blocking properties g/4 cm |
|---|---|---|---|---|
| Comparative Sample 2 | 36 | 48 | 94 | 2~3 |
| Comparative Sample 3 | 90 | 132 | 90 | 2~3 |

EXAMPLE 2

Dimethylpolysiloxane-methylvinylsiloxane copolymer (100 parts by weight; vinyl group content, 0.8 wt%; viscosity at 25° C., 800 cP) both of whose ends were blocked with dimethylvinylsiloxyl groups was combined with methylhydrogenpolysiloxane (3 parts by weight; viscosity at 25° C., 20 cP; both ends were blocked with trimethylsiloxyl groups) and powdery copolymer (20, 50 and 100 parts by weight; vinyl group content, 0.9 wt%) composed of $ViMe_2SiO_{1/2}$, $MeSiO_{3/2}$ and $SiO_{4/2}$ units (0.26/0.36/1.0 molar ratio). Samples 3, 4 and 5 were thus prepared. The viscosities of these samples at 25° C. were 1,280 cP, 2,640 cP and 5,300 cP, respectively. For comparison, a mixture of the above-mentioned vinyl-group-containing organopolysiloxane (100 parts by weight) and the above-mentioned methylhydrogenpolysiloxane (3 parts by weight) was combined with powdery copolymer (20 to 50 parts by weight) composed of $Me_3SiO_{1/2}$, $MeSiO_{3/2}$ and $SiO_{4/2}$ units (0.26/0.36/1.0 molar ratio). Comparative Samples 4 and 5 were thus prepared. The viscosities of these samples at 25° C. were 1320 cP and 2630 cP, respectively. A platinum-vinylsiloxane complex (100 ppm based on platinum) was added to each of the above-mentioned mixtures. The resulting composition was coated on glassine paper (about 1.2 g/m²) and heat treated at 160° C. for 20 seconds. An adhesive (Olibine BPS-5,127) was coated on the resulting cured film and then dried at elevated temperature. The peeling resistance, residual adhesion percentage and blocking properties were measured. The results are given in Table II. Samples 3, 4 and 5 exhibited a stable and time-independent peeling resistance, a high residual adhesion percentage and low blocking properties so that they were concluded to be excellent. On the other hand, the peeling resistance of Comparative Samples 4 and 5 which had been produced from component (c) which did not contain vinyl groups were time-dependent, the residual adhesion percentage was low and the blocking properties were high.

TABLE II

| Sample | Peeling resistance g/5 cm After 1 day | Peeling resistance g/5 cm After 30 days | Residual adhesion percentage % | Blocking properties g/4 cm |
|---|---|---|---|---|
| Sample 3 (this invention) | 46 | 45 | 94 | 2~3 |
| Sample 4 (this invention) | 72 | 73 | 93 | 2~3 |
| Sample 5 (this invention) | 196 | 198 | 95 | 2~3 |
| Comparative Sample 4 | 40 | 99 | 76 | 10~15 |
| Comparative Sample 5 | 58 | 236 | 67 | 25~30 |

EXAMPLE 3

Dimethylsiloxane-methylvinylsiloxane-methylphenylsiloxane copolymer (100 parts by weight; vinyl group content, 1.1 wt%; viscosity at 25° C., 500 cP) both of whose ends were blocked with dimethylvinylsiloxyl groups was combined with methylhydrogenpolysiloxane (2.0 parts by weight; viscosity at 25° C., 25 cP). The resulting mixture was combined with a dense and viscous liquid copolymer (15, 30 and 45 parts by weight; vinyl group content, 1.6 wt%) of $ViMe_2SiO_{1/2}$, $MeSiO_{3/2}$ and $SiO_{4/2}$ units (0.65/0.26/1.0 molar ratio). Samples 6, 7 and 8 were thus prepared. The viscosities of these samples at 25° C. were 780 cP, 1,100 cP and 1,530 cP, respectively. Platinum-vinylsiloxane complex (180 ppm based on platinum) was added to each of the above-mentioned mixtures. The resulting composition was coated (0.8 g/m²) on polyethylene laminated kraft paper and then heat treated at 160° C. for 30 seconds. An adhesive (Olibine BPS-2411 from Toyo Ink Mfg. Co., Ltd.) was coated on the cured film and then dried at elevated temperature. The peeling resistance and residual adhesion percentage were measured. The results are given in Table III.

TABLE III

| Sample | Peeling resistance g/5 cm After 1 day | Peeling resistance g/5 cm After 30 days | Residual adhesion percentage % |
|---|---|---|---|
| Sample 6 (this invention) | 36 | 38 | 95 |
| Sample 7 (this invention) | 79 | 77 | 94 |
| Sample 8 (this invention) | 138 | 140 | 95 |

That which is claimed is:
1. An organopolysiloxane composition, curable to a peelable film, said composition being obtained by mixing components consisting essentially of
   (a) 100 parts by weight of an organopolysiloxane having the formula $R'_aSiO_{(4-a)/2}$ and a viscosity at 25° C. of from 40 to 3000 centipoise, wherein each R' denotes a monovalent hydrocarbon or fluorinated hydrocarbon group and a is a number from 1.9 to 2.05, at least two R' groups being vinyl and at least 70 percent of all R' groups being methyl,
   (b) 0.5 to 20 parts by weight of an organohydrogenpolysiloxane having at least 3 silicon-bonded hydrogen atoms per molecule and a viscosity at 25° C. of from 1 to 1000 centipoise,
   (c) 2 to 200 parts by weight of a copolymer composed of $RSiO_{3/2}$ siloxane units in addition to $R_3SiO_{1/2}$ siloxane units and $SiO_{4/2}$ siloxane units wherein each R denotes a monovalent hydrocarbon group, at least two R groups per molecule being vinyl, the molar ratio of $(R_3SiO_{1/2})/(RSiO_{3/2})/(SiO_{4/2})$ being (0.1 to 1.5)/(0.1 to 1.0)/(1.0), and
   (d) a catalytic amount of a hydrosilylation catalyst, the viscosity of said organopolysiloxane composition, curable to a peelable film, having a value of from 50 to 6000 centipoise at 25° C.
2. A composition according to claim 1 wherein the molar ratio of $(R_3SiO_{1/2})/(RSiO_{3/2})/(SiO_{4/2})$ units in component (c) is (0.5 to 1.5)/(0.1 to 1.0)/(1.0).

* * * * *